May 26, 1936.  W. W. DRUMMEY  2,041,908
COMBINATION DESK AND SEAT
Filed Feb. 18, 1935  3 Sheets-Sheet 3
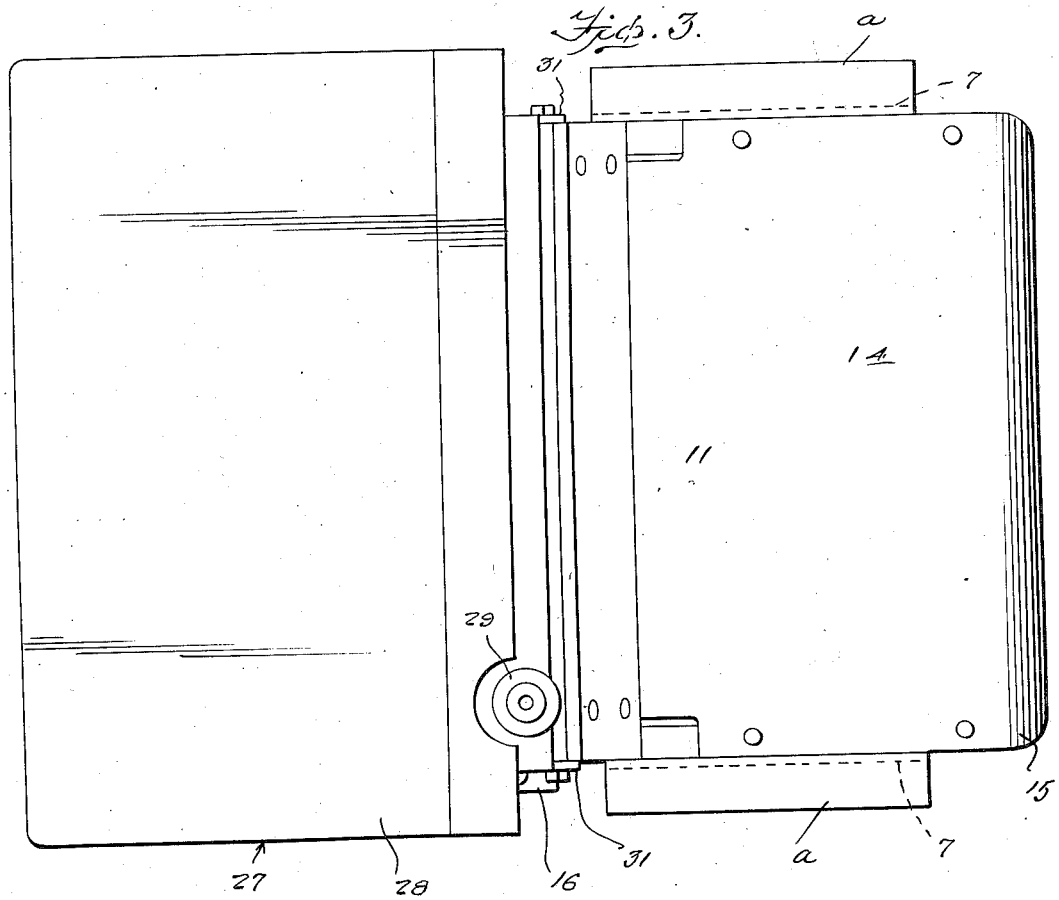
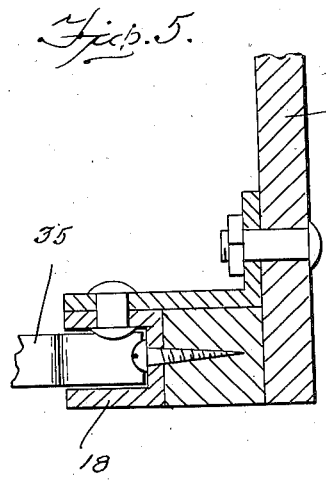
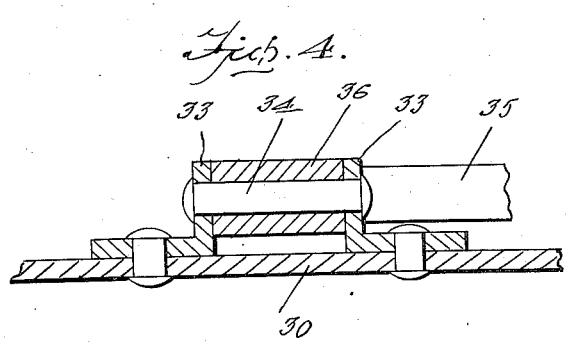
Inventor
W. W. Drummey
By Clarence A. O'Brien
Attorney Patented May 26, 1936

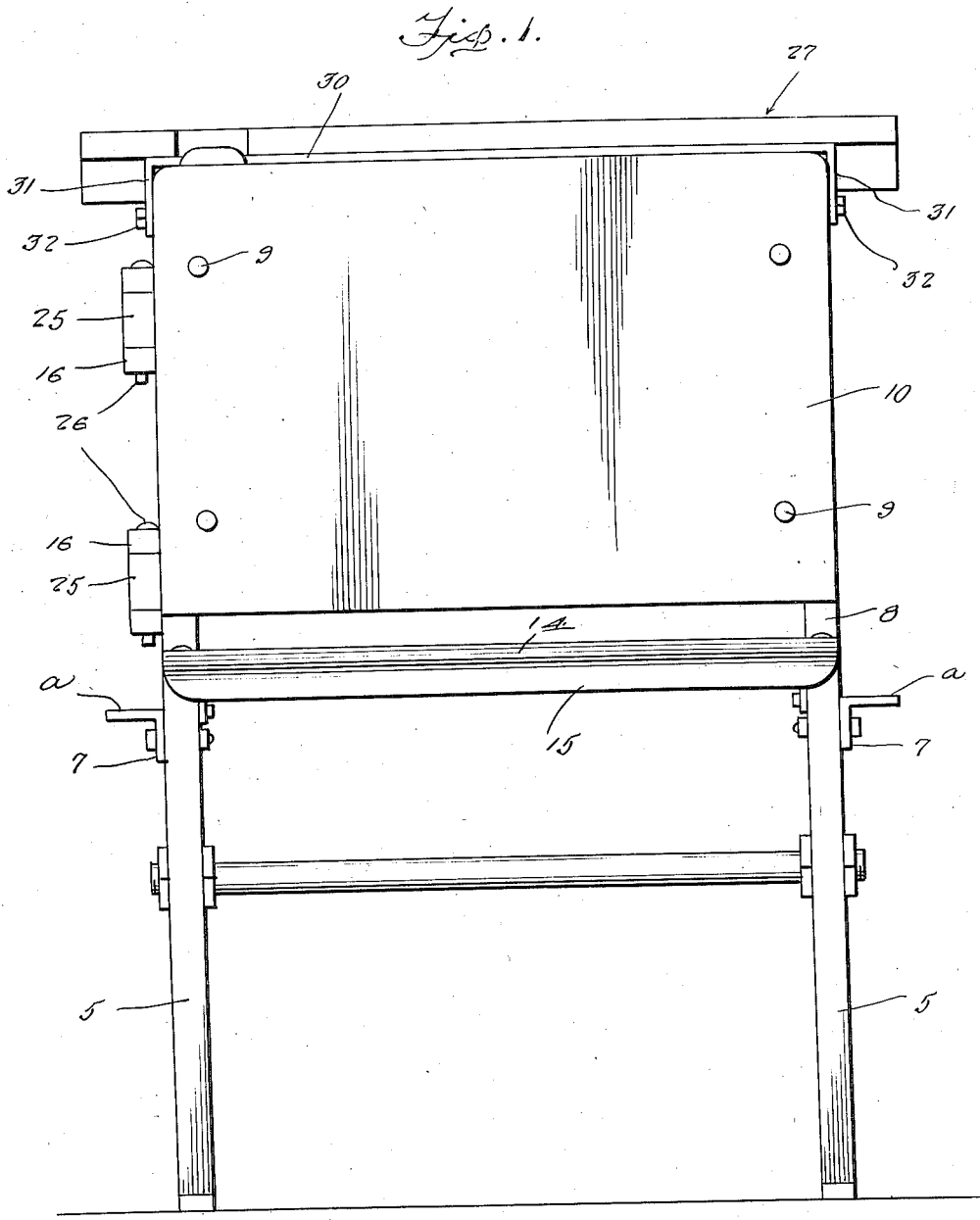

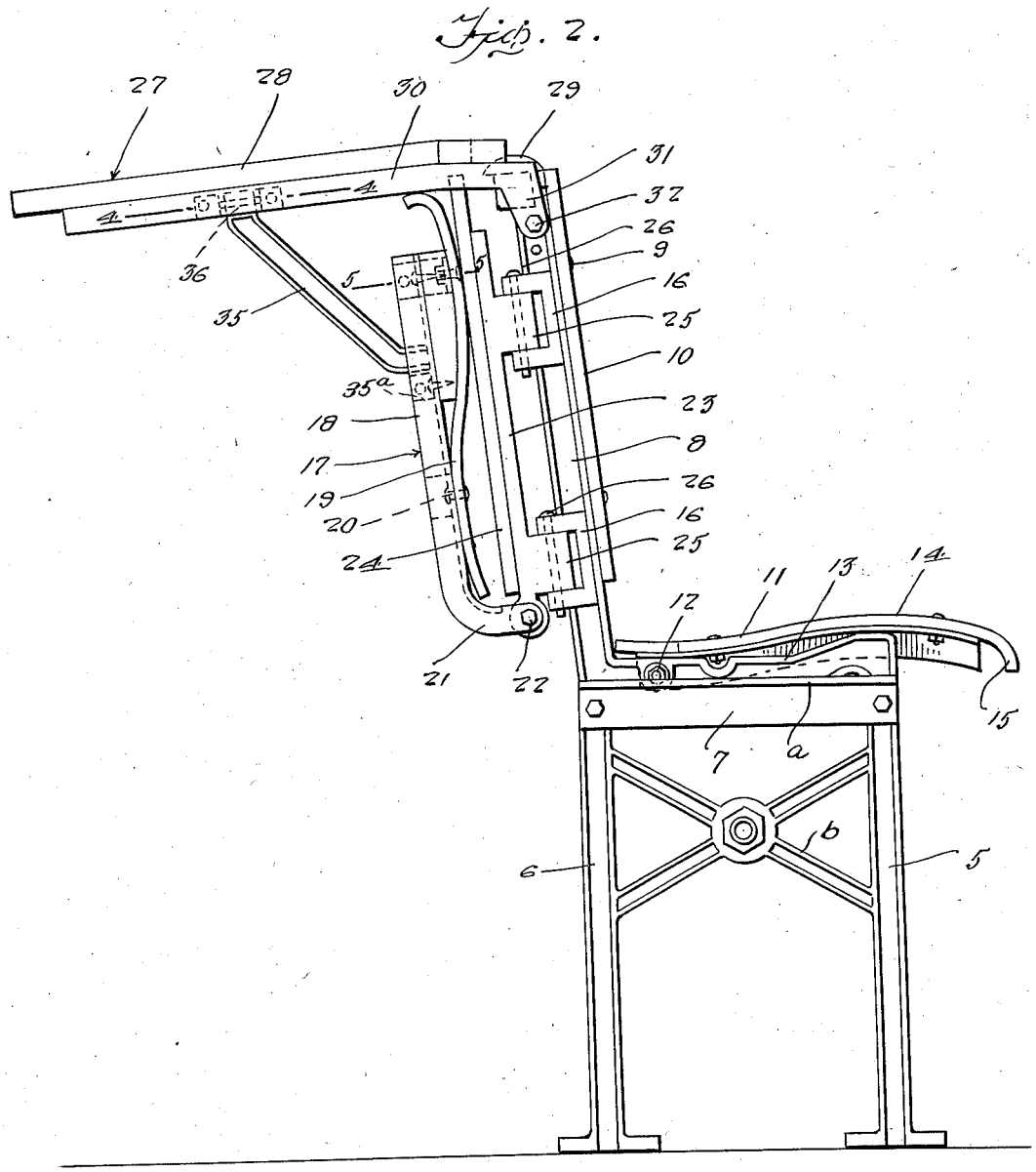

2,041,908

UNITED STATES PATENT OFFICE 2,041,908

COMBINATION DESK AND SEAT

William W. Drummey, Boston, Mass.

Application February 18, 1935, Serial No. 7,095

3 Claims. (Cl. 155—33)

This invention appertains to new and useful improvements in furniture and particularly auditorium furniture. More specifically the invention relates to combination desks and seats. The principal object of the invention is to provide an auditorium chair construction, wherein each chair consists of a main seat and back, and an auxiliary foldable seat and back construction mounted on the main seat back and adapted to be unfolded and swung to a lateral position adjacent the main seat and back.

Another important object of the invention is to provide a combined desk and seat structure of the character set forth wherein the collapsible assembly can be collapsed in such a manner that alternate seats in a row will be displaced behind adjacent seats, so as to make an aisle laterally of the remaining seats.

Still another important object of the invention is to provide an auditorium seating unit wherein the unit consists of a seat proper and a supplemental seat movably attached to the back of the seat proper, the unit further including a desk top swingably connected to the back of the seat proper, and provided with means which when engaged with the movable seat retains the movable seat in out of use position and the desk top in useful position.

These and various other important objects and advantages of the invention will become apparent to the reader of the following specification.

In the drawings:

Figure 1 represents a front elevational view of the seating unit with the auxiliary seat in concealed position.

Figure 2 represents a side elevational view of the seating unit with the desk top in useful position and shown holding the auxiliary seat in out of use position.

Figure 3 represents a top plan view of the assembly with the auxiliary seat in out of use position.

Figure 4 represents a fragmentary enlarged sectional view taken substantially on line 4—4 of Figure 2.

Figure 5 represents an enlarged fragmentary detailed sectional view taken substantially on line 5—5 of Figure 2.

Referring to the drawings wherein like numerals designate like parts, it can be seen that a seating unit includes the front legs 5 and the rear legs 6 bridged at their upper ends by the angle members 7, these angle members being secured to the upper ends of the legs 5 and 6 so that the flanges $a$ extend laterally.

Numerals 8—8 represent the vertical posts which are secured to the upper portions of the legs 6 in such a manner as to incline rearwardly at approximately five degrees. Secured to the front sides of the posts 8 by suitable elements 9 is the back rest 10.

Numeral 11 represents the seat proper which is pivotally connected at its inner end as at 12 to the horizontal lower end portion 13 of the post 8. (As can be clearly seen in Figure 2.) This seat 11 is provided with a raised convex portion 14 adjacent its forward end portion, while the forward extremity of the seat dips downwardly as at 15. Suitable brace members $b$ are provided between the legs 5—6.

A pair of vertically spaced U-shaped members 16—16 are secured to one of the posts 8 to accommodate the auxiliary seat generally referred to by numeral 17. This auxiliary seat consists of the supporting frame members 18 which are of channeled iron construction as shown in Figure 5 with the seat 19 riveted on as at 20, this seat 19 being of substantially the same construction as the seat 11. The attaching ends of the members 18 are bent laterally as at 21 and are pivotally connected as at 22 to the lower edge of the back plate 23 to which the back rest 24 of the auxiliary seat is secured. This back plate 23 is provided with barrel like formations 25 which engages within the U-shaped brackets 16 on the posts 8. These protuberances 25 along with the U-shaped bracket 16 accommodate pins 26 which extend through apertures in the end portions of the bracket 16 and through the barrels 25 thus constituting easy connection between the post 8 and the auxiliary seat.

Numeral 27 generally refers to the desk construction which consists of the top 28 having a suitably constructed ink well 29 carried thereby. The desk top 28 is provided with a supporting frame 30 to which it is attached and this frame 30 is provided with depending end members 31 which are pivotally connected as at 32 to the upper end portions of the posts 8.

The side portions of the frame 30 each is provided with a pair of bracket members 33—33 apertured to receive a pin 34.

For supporting the desk, a pair of brace members 35 are employed and each of these brace members is provided with a barrel formation 36 at its upper end through which the aforementioned pin 34 extends, thus swingably connecting the upper end of the brace to the desk top frame 30.

It can now be seen, that when the seating arrangement is to be used for scholastic congregations, the auxiliary seats 17 are not employed and are confined to the position shown in Figure 2, in which position the auxiliary seats serve to support the desk top 27. As will be observed in Figure 2 with the auxiliary seat swung rearwardly toward the back side of the back 10, the braces 35 of the desk top 27 which is being temporarily held outwardly from the back of the seat proper, are swung downwardly and their lower ends are engaged into the channelled members 18 of the auxiliary seat 17 as in the manner shown in Figure 2. A stop 35a is provided in each of the channels of the members 18 to limit downward sliding of the props 35. Thus the desk top 27 is supported in the proper position by the brace members 35 which incidentally serve to hold the auxiliary seat in folded position.

When the auxiliary seats are to be used, the desk top 27 is raised slightly so as to disengage the brace members 35 from the channeled members 18 of the auxiliary seat, after which the auxiliary seat is swung laterally and dropped so that the auxiliary seat rests upon the flange a of the adjacent angle member 7 as well as the flange of the angle member of the chair proper at the other side of the aisle. When the auxiliary seat is moved to this position, the desk top is of course dropped so as to repose closely to the back of the post 8.

While the foregoing specification sets forth the invention in specific terms, it is to be understood that numerous changes, in the shape, size and materials may be resorted to without departing from the spirit and scope of the invention as claimed hereinafter.

Having thus described the invention, what is claimed as new is:

1. A combination chair structure of the character described comprising a main seat and back, a desk top hingedly connected at one end to the upper portion of the rear side of the main back to permit vertical swinging of said desk top, a foldable auxiliary seat structure including a hingedly connected seat and back, a hinged connection between one vertical edge of the auxiliary back and one vertical edge of the main back, said desk top being provided with means engageable with the auxiliary seat when disposed to a folded position behind the main back for holding the auxiliary seat structure in folded position and supporting itself in useful position.

2. A combination chair structure of the character described comprising a main seat and back, a desk top hingedly connected at one end to the upper portion of the rear side of the main back to permit vertical swinging of said desk top, a foldable auxiliary seat structure including a hingedly connected seat and back, a hinged connection between one vertical edge of the auxiliary back and one vertical edge of the main back, said desk top being provided with means engageable with the auxiliary seat when disposed to a folded position behind the main back for holding the auxiliary seat structure in folded position and supporting itself in useful position, said means consisting of a prop having one end pivotally connected to the bottom side of the desk and its free end engageable with the folded auxiliary seat.

3. A combination chair structure of the character described comprising a main seat and back, a desk top hingedly connected at one end to the upper portion of the rear side of the main back to permit vertical swinging of said desk top, a foldable auxiliary seat structure including a hingedly connected seat and back, a hinged connection between one vertical edge of the auxiliary back and one vertical edge of the main back, said desk top being provided with means engageable with the auxiliary seat when disposed to a folded position behind the main back for holding the auxiliary seat structure in folded position and supporting itself in useful position, said means consisting of a prop having one end pivotally connected to the bottom side of the desk and its free end engageable with the folded auxiliary seat, said pivotal connection being arranged to permit lateral swinging of the prop with respect to the desk top.

WILLIAM W. DRUMMEY.